Jan. 5, 1960
G. F. HURST
2,919,886
BALL VALVE
Filed Sept. 3, 1953
2 Sheets-Sheet 1
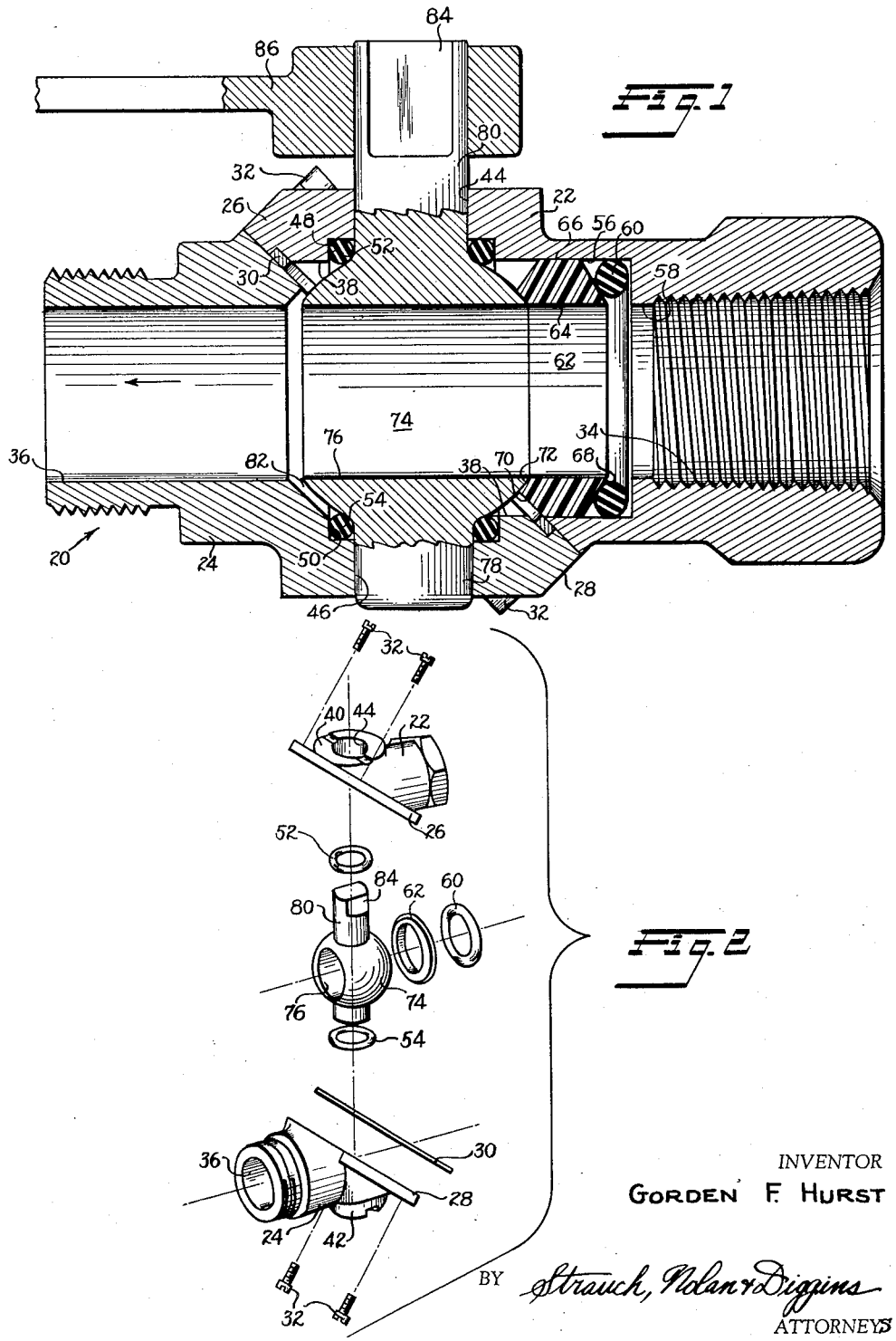
INVENTOR
GORDEN F. HURST
BY Strauch, Nolan & Diggins
ATTORNEYS Jan. 5, 1960  G. F. HURST  2,919,886
BALL VALVE Filed Sept. 3, 1953  2 Sheets-Sheet 2

INVENTOR
GORDON F. HURST

BY *Strauch, Nolan & Diggins*
ATTORNEYS

United States Patent Office 2,919,886
Patented Jan. 5, 1960

2,919,886

BALL VALVE

Gordon F. Hurst, San Jose, Calif.

Application September 3, 1953, Serial No. 378,325

6 Claims. (Cl. 251—172)

This invention relates to valves and more particularly to improved rotary plug or ball-type valves which are especially adaptable for use in high pressure fluid lines particularly for orchard sprayers and like high pressure systems.

Valves heretofore provided in the art have been found to present innumerable problems and embody unsatisfactory features in such high pressure usage. Most notable of these have been the complicated and unsatisfactory sealing of the valve both as to internal sealing around the valve body and sealing against external leakage around the valve trunnions or stems and joints. Sealing methods heretofore known to prevent external leakage have employed various complex forms of packing glands together with the necessary and equally complex packing compression screws which result in excessive manufacturing costs and have been found not to be completely satisfactory where high fluid pressures are involved. Additionally the provision of internal seals or ball seats heretofore known in the art have varied from a complete spherical seat formed by the cavity of the valve body to various complex inserted seats merely encircling the opening in the valve. The former type of seat results in excessive friction on the valve body making operation difficult as well as making perfect internal sealing of the valve body practically impossible. The second type of seat presently known in the art has also been found to be unsatisfactory since they do not provide an adequate seal and consequently are subject to internal leakage which results in a fluid turbulence and undesired pressure drop within the valve, have a tendency to blow out at high operating pressures, and have too great a frictional contact wtih the valve body which causes difficulty in opening and closing the valve.

Of further consideration in the prior art devices is the failure of any of the known devices to provide a satisfactory housing for a valve body having integral stems or trunnions. In those devices presently known wherein the valve body does have integral stems the housings have been of two general types. The first employs two-piece or split housing and complicated packing glands heretofore noted as unsatisfactory and exorbitantly expensive to manufacture. The second employs a housing with a removable side plate held to the housing by snap rings or other means. For smaller valves the latter construction is adequate but on larger or high pressure valves the side plates have shown a tendency to blowout due to the large area exposed to pressure.

The present invention obviates all these undesirable difficulties and has for its principal object the provision of a valve that is particularly adaptable, because of its simplicity and low cost of manufacture, for orchard spraying and like usage.

It is a further important object of the present invention to provide a simplified valve mechanism having increased operating efficiency.

Another object of this invention is to provide a valve mechanism having a simplified and improved sealing means.

Still another object of this invention is to provide a ball valve mechanism having an improved valve seat.

Yet another object of this invention is to provide a valve mechanism having an improved means to prevent inlet fluid from by-passing the valve.

A further object of this invention is to provide a ball valve mechanism having a novel two-piece housing.

An additional object of this invention is to provide a ball valve mechanism with a ball valve member having integral trunnions and novel means for mounting the ball in the valve housing.

Another object of this invention is to provide a valve mechanism having pressure assisted seals to prevent internal and external fluid leakage.

Still another object of this invention is to provide a ball valve mechanism with novel drain means.

Yet another object of this invention is to provide a valve mechanism including a body having integral trunnions with identical housing sections having through openings for interchangeable mounting of the trunnions.

It is also an object of this invention to provide a ball valve mechanism comprising a two piece housing, a ball valve with integral trunnions, an improved valve seat on the inlet side of the ball, and novel pressure assisted seal means.

Yet another object of this invention is to provide a ball valve mechanism comprising a novel two piece housing with means for selectively mounting an improved ball valve seat on either side of the ball valve to permit use of the valve under a pressure or suction head.

An additional object of this invention is to provide a ball valve mechanism with novel axially movable valve seats adjacent the ports of the valve and on opposite sides of the ball valve in which only the seat at the side of the valve body is operative to prevent fluid from by-passing the ball valve.

A further object of this invention is to provide a valve mechanism comprising a trunnion mounted ball valve with improved mounting for trunnion seals whereby the valve can be efficiently employed in a pressure or vacuum system without disturbing or lessening the sealing efficiency of the trunnion seals.

These and other objects and advantages will appear from the following description and appended claims when read in conjunction with the attached drawings wherein:

Figure 1 is a vertical sectional view of a novel valve made pursuant to this invention and showing an upstream synthetic valve seat, pressure assisted seals, split housing, and a ball having integral trunnion stems;

Figure 2 is an exploded view of the novel valve of the present invention showing the various parts in their relative positions;

Figure 3:
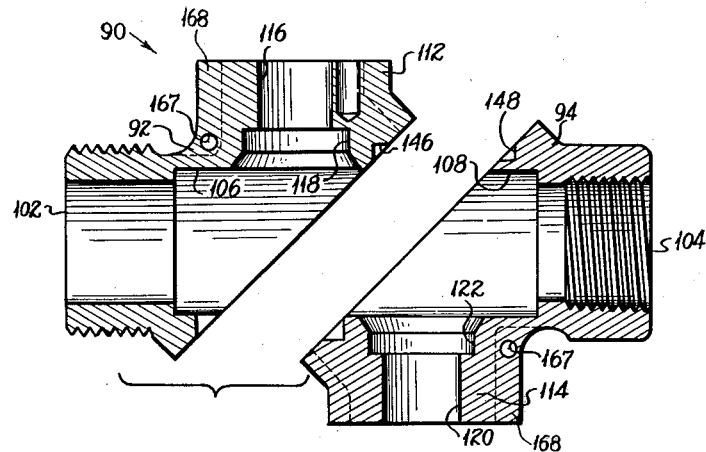
Figure 3 is a sectional exploded view of a modified valve housing of a further embodiment of this invention.

Referring more particularly to the drawings, there is generally indicated at 20 the novel valve assembly of this invention. Valve assembly 20 comprises an upper housing member 22 and lower housing member 24 provided respectively with mating connecting flanges 26 and 28 disposed in a transverse plane lying at an angle at 45° to the longitudinal axis or flow line of the valve. The flanges are secured together with a gasket 30 therebetween as by bolts 32 with opposite pairs of bolts threaded respectively into flanges 26 and 28 from opposite sides as best seen in Figure 2. Inlet 34 and outlet 36 are respectively provided in members 22 and 24 and terminate in respective enlarged mating semi-spherical cavities 38 which form a valve body chamber or recess. Each member is provided with a boss 40 and 42, respectively, extending outwardly from its enlarged cavity 38 and providing respective through bores 44 and 46 extending at right angles to the axis of the respective inlet 34 and outlet 36 and respectively adapted in assembled relation to lie in axial alignment.

Enlarged counterbores 48 and 50 are provided at the respective inner ends of bores 44 and 46, for receiving resilient O-ring seals 52 and 54, for a purpose to be hereinafter described.

Housing member 22 at least is provided with an enlarged cylindrical counterbore 56 in coaxial alignment with bore 34 at its inner end forming a substantial continuation of enlarged cavity 38 extending to an inwardly extending integral shoulder 58. An O-ring seal 60 is mounted in bore 56 contiguous to shoulder 58.

As best seen in Figure 1, a removable valve seat comprising a synthetic ring 62, preferably of nylon, having a bore 64 substantially equal in diameter to inlet 34, an outer annular surface 66 providing a smooth face and of a diameter to be snugly but slidably received in counterbore 56 and a pair of angulated end surfaces 68 and 70 sloping axially and inwardly from surface 66. Ring 62 in end surface 70 is provided with a conical counterbore 72 for a purpose which will hereinafter appear. Ring 62 is mounted in bore 56, with a close sliding fit between bore 56 and annular surface 66 and with end surface 68 in contact with resilient seal 60.

Valve body 74 in the form of a ball having an axially extending passage 76 arranged for alignment with inlet 34 and outlet 36 is disposed in the spherical recess formed by mating cavities 38 and is provided with short integral trunnion 78 and coaxially aligned integral actuating trunnion 80 rotatably mounted in bores 44 and 46, respectively. As best seen in Figure 1, valve body 74 is maintained in centered spaced relation to the spherical recess formed by mating cavities 38 and by its journalled mounting in bores 44 and 46 and O-rings 52 and 54 are disposed in surrounding relation to trunnions 78 and 80 and in counterbore 72 of seat 62 which sealingly engages the spherical surface of ball 74 on the inlet side of the ball. This relationship of valve body and chamber provides a spherical chamber around the ball that is always in communication with outlet 36 through annular passageway 82. This spacing chamber reduces the frictional contact on ball 74 and also serves a purpose to be hereinafter described.

O-rings 52 and 54 engaging the outer diameter of trunnions 78 and 80 and the walls of counterbores 50 and 48 respectively form a fluid tight seal therebetween. As the O-rings are exposed to the line pressure when the valve is open, they are automatically deformed to an increasing degree as the line pressure increases to assure maximum sealing. Thus the need for packing glands and pressure nuts is completely obviated.

Trunnion 80 is provided with a pair of diametrically opposed flats 84 for receiving an actuating handle 86 for selectively moving ball 74 between open and closed position. As illustrated in Figure 1, upper housing member 22 is provided with a female pipe thread while member 24 is provided with a male thread, however, it will be appreciated that identical fittings or the reverse of that shown in Figure 1 may be provided.

A further feature of the novel valve of this invention is that bores 44 and 46 are of the same diameter and trunnions 78 and 80 are of the same diameter. Since bores 44 and 46 extend completely through their respective housing members ball valve 74 may be assembled as shown in Figure 1 or in an inverted position with actuating trunnion 80 extending out of bore 46. This facilitates alternate field installations where other structure may prevent installation with the parts assembled as shown in Figure 1.

With ball 74 in either the open position as shown in Figure 1 or the closed position, fluid under pressure fills inlet 34 and applies line pressure to the valve parts at the inlet side of ball 74. This line pressure at all times exerts an axial force on the exposed portion of end surface 68 of nylon seat ring 62 and radial pressure on O-ring 60 tending to deform it to increase its axial dimension. These axial forces are effective to force counterbore 72 into intimate sealing contact with the spherical surface of ball 74 at all times to prevent fluid leakage therebetween. Thus it will be clear that inlet fluid is positively prevented from by-passing the valve body in all positions of the valve and is either compelled to flow through passage 76 to outlet 36 or is absolutely prevented from flowing when the valve is closed. This is extremely important in handling the present day, highly toxic orchard spray solutions to assure personnel against accidental contact with the solutions in operating the control valves.

When the valve is opened, fluid flowing from the inlet to the outlet will also pass into the chamber surrounding ball 74 through opening or passage 82. This fluid pressure in the chamber, as heretofore suggested, will compress O-seal rings 52 and 54 pressing them into more intimate sealing contact with their respective housing bores and trunnions to positively prevent external leakage. This fluid pressure in the chamber surrounding valve body 74 acts also to hydraulically balance the valve in open position by subjecting all sides to the same pressure thus eliminating eccentric loading of the trunnions. When the valve body is rotated to closed position, a substantial amount of the fluid around the valve body will drain from the chamber surrounding the valve body by means of opening 82 and pass to the outlet. A minimum of fluid is trapped in the chamber and freezing of this slight quantity of fluid will be insufficient to prevent relatively immediate thawing of the fluid and immediate operation of the valve if it is properly connected in the line.

It is to be understood that the foregoing described novel valve assembly operates just as efficiently in a suction system as it does in a positive pressure system. That is, a suction can be applied to the valve drawing fluid from a fluid source through inlet 34 and discharging through outlet 36. In this connection of the valve, the fluid flow being from inlet side 34 toward outlet side 36 will exert similar forces on the surfaces of nylon seat ring 62 and O-ring 60 to force these members into sealing engagement with ball valve 74, bore 56 and surface 68, respectively. Thus it will be readily appreciated that the present novel ball valve has universal application in either a positive pressure head system or in a vacuum or suction system.

Figure 4:
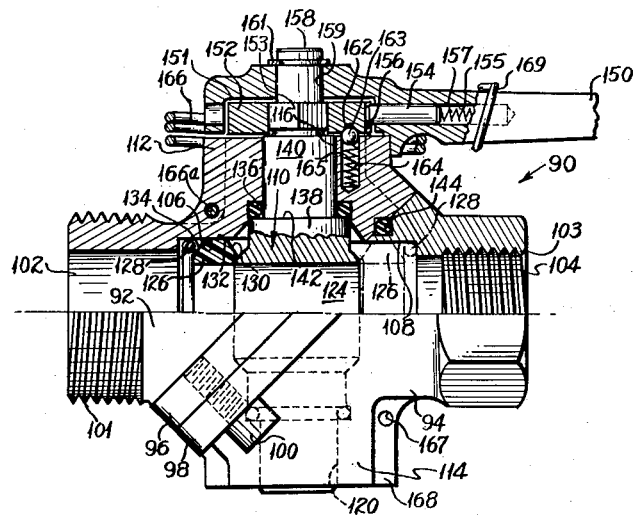
Figure 4 is a partial sectional view of the further embodiment of this invention showing the various elements in their assembled relation.

Turning now to Figures 3 and 4 there is shown a further embodiment of this invention, generally designated 90. As shown in Figure 3 upper and lower housing members 92 and 94 are connected together along mating flanges 96 and 98 as by bolts 100 and are provided with axially aligned ports or inlet and outlet bores 102 and 104, respectively. Bores 102 and 104 extend inwardly from the free ends of their respective members and are connected to and are coaxial with enlarged counterbores 106 and 108 extending through the housing members 92 and 94 from flanges 96 and 98, respectively.

In the assembled position as illustrated in Figure 4, counterbores 106 and 108 define an internal axially extending substantially cylindrical ball valve chamber generally designated 110.

As clearly seen in Figure 3, members 92 and 94 are each provided with enlarged external bosses 112 and 114, adjacent flanges 96 and 98, respectively. Boss 112 is provided with bore 116 which terminates in enlarged coaxial counterbore 118 at its inner end. Boss 114 is similarly provided with bore 120 and counterbore 122.

In the assembled position of Figure 4, bores 116 and 120 and counterbores 118 and 122 are disposed in axial alignment on an axis substantially perpendicular to the longitudinal axis of inlet 102 and outlet 104.

Counterbores or cavities 106 and 108 of Figures 3 and 4 are similar to counterbore 56 and serve the same purpose of mounting a novel floating removable ball valve seat and seal.

Valve seat ring 126 is provided with surfaces 130, 132 and 134 which perform the same functions as surfaces 72, 66 and 68 respectively, in the embodiment of Figures 1 and 2.

With the foregoing described double ball valve seal cavities 106 and 108 on both sides of a ball valve 124, novel nylon seat ring 126 and associated O-ring seal 128 similar to seat 62 and seal 60, can be selectively interchangeably mounted on either side of ball valve 124 to thereby adapt valve 90 for fluid flow in either direction.

In using the valve normally, fluid flow from port 102 to port 104 reacts on seat 126 and seal 128 in the same manner as heretofore described in connection with the embodiment of Figures 1 and 2 to prevent the fluid from by-passing valve 124 in either its open or closed positions.

However, should the threading on valve 90 be as indicated, male threads 101 and female threads 103, and the associated fluid lines be such that port 102 rather than 104 must be connected to the upstream line, then seat 126 and seal 128 can be mounted in the position shown by phantom lines in Figure 4 so that the fluid flowing into port 104 will exert the desired forces on the seat and associated seal to prevent the fluid from by-passing valve 124.

It is to be understood that with dual seat cavities 106 and 108, two valve seats 126 with associated O-rings 128 can be mounted in the valve at the time of initial assembly on opposite sides of valve 124 as indicated by the full line and phantom line illustration in Figure 4. With a seat 126 and O-ring 128 disposed on both sides of valve 124, the only seal and seat that will be effective as a sealing member will be that on the upstream side of valve 124. For example, referring to Figure 4 and assuming pressure fluid to be entering through inlet 102, the upstream seat 126 and seal 128 on the left hand side of valve 124 will function in the manner of seat 62 and seal 60 heretofore described in connection with the embodiment of Figures 1 and 2 to prevent fluid from by-passing valve 124. However, seat 126 and seal 128 on the right hand side of valve 124 will not be sealing, but actually will be spaced to the right slightly away from ball valve 124 due to the drag on these members by the fluid flowing from inlet 102 to outlet 104 causing seat 126 and seal 128 to be moved to the right away from valve 124. Thus the same effective sealing is attained by the upstream seal 126—128 while the downstream seal 126—128 which is unloaded permits fluid to enter chamber 110 and form a fluid balance of valve 124 when the valve is open and a substantial drainage of chamber 110 when valve 124 is moved to closed position.

Should inlet 102 be connected downstream of the controlled fluid, then seat 126 and its associated seal 128 on the right hand side of valve 124 will be subjected to the sealing forces of the fluid entering through port 104 and seat 126 will be forced into a fluid tight seal with the right hand side of valve 124 and associated seal 128 will be forced into a fluid tight seal with counterbore 108 and surface 134. The seal and seat on the left hand side of valve 124 will be unloaded or moved slightly to the left away from valve 124, as viewed in Figure 4 by virtue of the drag of the fluid on these members flowing through the valve from port 104 to port 102. The unloading of the left hand seat 126 and associated seal will permit fluid to enter chamber 110 from the left side of valve 124 when the valve is open to fluidly balance the valve and drain from the chamber when the valve is in closed position.

With the foregoing dual mounted seats of Figures 3 and 4, only one of which is loaded and effective as a seal during any particular operation, it will be readily appreciated that the valve can be readily applied without reference to the direction of fluid flow and without the need of turning the valve around or repositioning a single seat 126 and O-ring 128 from one side to the other. This adaptability of the last described valve embodiment results in lower cost of operation while still maintaining the desired features of an inexpensive, structurally strong and efficient operating valve particularly useful in conjunction with orchard spraying equipment.

A further modification over that shown in Figures 1 and 2 is the mounting of trunnion seals 136 in Figure 4. As shown, valve 124 is provided with oppositely axially extending integral bosses 138 of equal diameter and just slightly smaller than counterbores 118 and 122. Integral equal diameter trunnions 140 extending outwardly from bosses 138 are of smaller diameter than the bosses and define therewith annular shoulders 142 lying in a plane substantially perpendicular with the axis of trunnions 140. In the assembled position, O-rings 136 are mounted on trunnions 140 in abutting contact with shoulders 142 and are also disposed in contacting relation with the bottom and sides of the respective counterbores 118 and 122. Thus seals 136 are substantially enclosed in a chamber defined by counterbores 118 and 122 and associated shoulders 142. This construction prevents any misalignment or displacement of seals 136 from their effective sealing position and produces double ended seals particularly effective under either a positive pressure head or negative pressure head or suction. The slight difference in diameters between bosses 138 and the associated counterbores 118 and 122 permits fluid pressure in chamber 110 to be exerted on seals 136 to pressurize the seals during operation of the valve to assure maximum sealing efficiency of seal 136, as described in connection with Figures 1 and 2.

Additionally annular flange seal 144 is disposed in a groove defined by complementary grooves 146 and 148 in the mating faces of flanges 96 and 98 and is completely surrounded by the flange surfaces and spaced from the ports 102 and 104 and chamber 110 of the valve. The use of an annular seal and the mounting of seal 144 in a groove rather than the use of a flat gasket, which requires substantially flat mating surfaces, assures better sealing between the flanges by virtue of more effective and complete compression of the annular type seal 144 between flanges 96 and 98 by bolts 100.

Valve 90 is provided with an actuating handle 150, similar to handle 86, having a recess 151 housing a ratchet member 152 matingly receiving hexagon section 153 milled on one of the valve trunnions, as clearly seen in Figure 4, to permit selective actuation of the ball valve 124. A ratchet pawl or plunger 154 slidably supported in bore 155 of handle 150 is biased outwardly to engage one of a plurality of one way drive notches 156 in member 152 by a compression spring 157 in bore 155. Journalled movement of handle 150 around the axis of rotation of trunnions 140 and ratchet member 152 is assured by concentric grooved journal extension 158 extending from the exposed face of milled section 153 and cooperating with the journal bore 159 formed in the hub of handle 150 in concentric relation to recess 151. A split snap ring 161 of well known construction retains handle 150 in place on journal extension 158.

To assure proper positioning of valve body 124 in fully open and fully closed positions, the face of ratchet member 153 opposite to the end face of boss 112 or 114 as the case may be is provided with at least two ninety degree offset conical seats 162 adapted to receive spring pressed position indicating ball 163. Ball 163 is retractably mounted in a bore 164, one of which is formed in each of the end faces of bosses 112 and 114 for selective usage depending upon which boss hexagon section 153 and journal extension 158 extend from. A compression spring 165 housed in bore 164 biases ball 163 outwardly into mating contact with the face of ratchet member 152 so that ball 163 will resiliently but firmly snap into one or another of seats 162 to arrest movement of handle 150 at the selected valve position. It will be appreciated that additional seats 162 may be provided at selected angular positions around the face of member 152, if desired, to determine such intermediate valve positions as may be desired.

While handle 150 may be held in the last position to which it is turned by cooperation of ratchet plunger 154 and ratchet member 152, a coil return spring 166 having one end 166a disposed in bore 167 (Figure 3) formed in webs 168 diametrically disposed in body sections 92 and 94 with respect to bores 164 and its other end formed in a loop 169 to engage the hand portion of handle 150. As shown in Figure 4, spring 166 is substantially relaxed, it having returned handle 150 in a counterclockwise direction to its normal position in longitudinal alignment with the axis of the fluid path through the valve. In this position, plunger 154 is operatively engaged with a notch 156 of ratchet member 152 so that clockwise rotation of the handle will cause similar rotation of member 152 and valve 124 to its next selected position. Such clockwise rotation of handle 150 also tensions spring 166 so that, upon release of the handle, spring 166 will become effective to return handle 150 in counterclockwise direction to its normal rest position, the notches 156 being so formed as to permit counterclockwise ratchetting movement of plunger 154 over the periphery of ratchet member 152. It will be appreciated, therefore, that this ratchet valve operator assures automatic positioning of handle 150 in its position of least interference without conscious manipulation by the operator.

It will be appreciated from the foregoing description that this invention provides a valve structure which is extremely simple and inexpensive to manufacture, since it requires a minimum of simple drilling and finishing operations. Further, the unique line pressure assisted seals and the pressurized or loaded valve seat and seal assure maximum efficient operation without detrimental pressure drop or eddying and the unique drain feature made possible by an unsealed side of the valve body remote from the intake port permits the major quantity of fluid surrounding the valve to be drained therefrom thereby lessening the chances of having the recess totally filled with a frozen fluid during cold weather operation. The amount of fluid that may be trapped around the lower portion of the valve is so slight that it could be rapidly melted should it freeze.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid valve comprising a two-piece housing joined in intimate leakproof relation having externally opening spaced fluid ports, a recess communicating with said ports, and opposed journal bores intersecting said recess; a valve body shaped and dimensioned to be received in said recess and having opposed integral trunnion shafts thereon for journalling said valve body in said journal bores in spaced relation to the wall of said recess and a passage therethrough for selectively connecting said ports; resilient sealing means in said recess interposed between said valve body and the wall of said recess in surrounding relation to said trunnions to form a leakproof seal therebetween and resiliently support said valve body in said recess for limited movement axially of said trunnion shafts; means for selectively coupling one of said ports to a fluid source; a valve seat axially movably disposed in said housing between said valve body and said one port and having a bore therein arranged to be aligned with said passage upon selective connection of said passage and said ports and a seat recess shaped to sealingly cooperate with the periphery of said valve body surrounding an end of said passage in all positions of axial movement of said valve body, said trunnion seals and said valve seat cooperating to supportingly guide and limit axial displacement of said valve body and assure alignment of said passage and said ports; a resilient O-ring sealing member interposed between a peripheral marginal area of the upstream face of said valve seat and said housing deformable under line pressure to define with said face of said valve seat pressure areas exposed to the line pressure in said one port to insure intimate leakproof contact between said valve body and said seat and to provide a leakproof seal between said one port and said valve in all positions of said valve body; passage means connecting said recess to said other port at all times whereby fluid under line pressure is admitted to said recess when said valve is in an open position to hydraulically balance said valve body and deform said resilient sealing means surrounding said trunnions and pressure assist said sealing means to provide a leakproof seal between said bores and trunnions, and allow said fluid to be substantially drained from said recess when said valve is in a closed position.

2. A fluid valve comprising a housing having spaced fluid ports, an internal recess communicating with the inner ends of said ports, and opposed journal bores intersecting said recess; a valve body shaped and dimensioned to be received in said recess and having opposed trunnion shafts arranged thereon for journalling said valve body in said journal bores in spaced relation to the walls of said recess and a passage therethrough adapted for selectively communicating with said ports; valve seat cavities in said housing at the inner ends of each of said ports; means for selectively connecting one of said ports and its associated cavity to a fluid source; valve seats axially movably disposed in each of said cavities and having respective bores communicating with said passages upon selective connection of said passage and ports and seat recesses opposed to said valve body and shaped to slidingly and sealingly cooperate with the periphery of said valve body surrounding the opposite ends of said body passage; a deformable sealing member interposed between the face of each of said valve seats remote from said valve body and the adjacent end wall of a respective cavity, said seal in said cavity upstream from said recess being operative under the influence of fluid pressure in said upstream cavity to move said seat into intimate leak proof contact with said valve body in said recess and to deform into sealing engagement with the annular wall of said upstream cavity and its associated seat to provide a leakproof seal therebetween and said seal and seat in said cavity downstream from said valve recess being operative under the influence of fluid pressure to be retained away from said valve body whereby fluid enters said recess around said valve body to hydraulically balance said valve body; and resilient seals disposed between said journal bores and trunnions at the juncture of said trunnions with said valve body to resiliently support said valve body for limited movement laterally with respect to said valve seats to align said passage and housing ports and operative under the influence of fluid pressure in said recess to deform and form fluid tight leakproof joints between said journal bores and trunnions.

3. A fluid valve as set forth in claim 2 wherein said journal bores and trunnions are provided with opposed shoulders for properly locating and preventing displacement of said seals under all operating conditions of said valve.

4. A fluid valve comprising a two-piece housing joined in intimate leakproof relation having externally opening, spaced, fluid ports, a recess communicating with said ports, and opposed journal bores intersecting said recess; a valve body shaped and dimensioned to be received in said recess and having opposed integral trunnion shafts arranged thereon for journalling said valve body in said journal bores in spaced relation to said recess wall and a passage therethrough adapted for selectively connecting said ports; resilient annular seals in said recess interposed between the wall of said recess and said valve body in surrounding relation to the inner ends of said trunnions to form a leakproof seal therebetween and resiliently support said valve body in spaced relation in said recess for limited movement axially of said trunnion shafts; means for selectively connecting one of said ports and its associated cavity to a fluid source; valve seat cavities in said housing at the inner ends of said ports; valve seats axially movably disposed in each of said cavities having respective bores communicating with said passages upon selective connection of said passage and ports and respective seat recesses opposed to said valve body and shaped to slidingly and sealingly cooperate with the periphery of said valve body surrounding the opposite ends of said body passage whereby operative alignment of said passage and said fluid ports is assured in all positions of axial movement of said valve body; and a deformable O-ring seal member interposed between the face of each of said valve seats remote from said valve body and the adjacent end wall of a respective cavity, said seal in said cavity upstream from said recess being operative under the influence of fluid pressure in said upstream cavity to move its associated seats into intimate leakproof contact with said valve body and to deform into sealing engagement with the annular wall of said upstream cavity and seat to provide a leakproof seal therebetween, and said seal and seat in the other cavity being operative under the influence of fluid pressure to be held away from said valve body and form a passage means connecting said recess to said other cavity at all times whereby fluid under line pressure is admitted to said recess when said valve is in an open position to hydraulically balance said valve body and deform said resilient annular seals and provide a leakproof seal between said bores and trunnions and said admitted fluid is allowed to substantially drain from said recess when said valve is in a closed position.

5. A fluid valve as set forth in claim 4 wherein said resilient annular seals are disposed between a shoulder in said journal bores and a shoulder on said trunnions to properly locate and prevent displacement of said sealing members under all operating conditions of said valve.

6. In a fluid valve comprising a housing having externally opening spaced fluid passages, an internal recess communicating with said passages, and opposed journal bores intersecting said recess, said recess being formed by opposed substantially annular end wall faces adjacent the inner ends of said passages and a substantially cylindrical side wall face extending between said end faces; a rotatable one-piece valve body shaped and dimensioned to be freely received in said recess and having opposed trunnion shafts arranged thereon for axially slidably journalling said valve body in said journal bores in spaced relation to the faces of said recess and the respective inner ends of said passages and a through passageway adapted for selectively connecting said passages; a valve seat axially movably disposed in said recess between said valve body and the one of said passages adapted to be connected to a source of incoming fluid and having a seat face contacting said valve body, an opposite end face diverging in the direction of fluid flow and exposed to line pressure and a bore therein arranged to extend between said seat face and said opposite end face and communicating in adjacent relationship with said through passageway upon selective positioning of said valve body to connect said passages, said opposite end face of said valve seat forming a substantially annular wedge-shaped cavity with said cylindrical wall face of said recess; a seat seal for preventing pressure and fluid leakage around said seat into said body recess and conditioning said seat for pressure responsive movement into sealed engagement with said valve body comprising a deformable O-ring sealing means disposed in said cavity against said opposite end face and said cylindrical wall face in spaced relation to said annular end face, said sealing means being adapted under the influence of increasing fluid pressure in said cavity to be deformed and forced into sealing contact across the corner formed by the intersection of said cylindrical wall face and said opposite end face to establish a leak-proof seal between said valve seat and said housing entirely along two lines of contact in all positions of said valve body and to increase the seating pressure applied to maintain said seat in intimate leak-proof contact with said valve body as the fluid pressure is increased.

References Cited in the file of this patent

UNITED STATES PATENTS

| | | |
|---|---|---|
| 715,113 | Mitchell | Dec. 2, 1902 |
| 1,252,490 | Peris | Jan. 8, 1918 |
| 1,784,381 | O'Stroske | Dec. 9, 1930 |
| 2,086,001 | Shaw | July 6, 1937 |
| 2,442,642 | Eckel | June 1, 1948 |
| 2,520,288 | Shand | Aug. 29, 1950 |
| 2,525,799 | Hecker | Oct. 17, 1950 |
| 2,567,032 | Schmidt | Sept. 4, 1951 |
| 2,592,062 | Perry | Apr. 8, 1952 |
| 2,593,733 | Davies | Apr. 22, 1952 |
| 2,599,774 | Ohls | June 10, 1952 |
| 2,628,808 | Ericson | Feb. 17, 1953 |
| 2,701,119 | Smith | Feb. 1, 1955 |
| 2,762,601 | Clade | Sept. 11, 1956 |
| 2,767,737 | Turak | Oct. 23, 1956 |
| 2,796,230 | Grove | June 18, 1957 |

FOREIGN PATENTS

| | | |
|---|---|---|
| 716,610 | Great Britain | Oct. 13, 1954 |
| 734,379 | Great Britain | July 27, 1955 |